US012786777B2

(12) United States Patent
Klatt

(10) Patent No.: US 12,786,777 B2
(45) Date of Patent: Nov. 3, 2026

(54) METHOD FOR TAKING INTO ACCOUNT ENERGY INTENSITY REGARDING THE TRANSMISSION OF DATA PACKETS, AS PART OF A QUALITY-OF-SERVICE-CONTROLLED DATA CONNECTION, TOWARDS A USER EQUIPMENT, TELECOMMUNICATIONS NETWORK, USER EQUIPMENT, PROGRAM, AND COMPUTER-READABLE MEDIUM

(71) Applicant: Deutsche Telekom AG, Bonn (DE)

(72) Inventor: Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 267 days.

(21) Appl. No.: 18/558,743

(22) PCT Filed: May 2, 2022

(86) PCT No.: PCT/EP2022/061711
§ 371 (c)(1),
(2) Date: Nov. 3, 2023

(87) PCT Pub. No.: WO2022/233786
PCT Pub. Date: Nov. 10, 2022

(65) Prior Publication Data
US 2024/0236753 A1 Jul. 11, 2024

(30) Foreign Application Priority Data
May 7, 2021 (EP) .................................... 21172639

(51) Int. Cl.
*H04W 28/02* (2009.01)

(52) U.S. Cl.
CPC ... *H04W 28/0221* (2013.01); *H04W 28/0268* (2013.01)

(58) Field of Classification Search
None
See application file for complete search history.

(56) References Cited

U.S. PATENT DOCUMENTS 8,014,280 B2 9/2011 Zhang et al.
8,515,410 B1 * 8/2013 Bach ................ H04W 52/0206
455/418

(Continued)

FOREIGN PATENT DOCUMENTS

CN 101810027 A 8/2010
CN 106454850 A 2/2017

(Continued)

OTHER PUBLICATIONS

Intel Corporation: "Sidelink Evaluation Methodology Update for UE Power Saving", 3GPP Draft; R1-2005895, 3rd Generation Partnership Project (3GPP), Mobile Competence Centre; Aug. 8, 2020 (Aug. 8, 2020), pp. 1-8, vol. RAN WG1, No. e-Meeting; 650, Route Des Lucioles; F-06921 Sophia-Antipolis Cedex; France, XP051917797, Retrieved from the Internet: URL:https://ftp.3gpp.org/tsg_ran/WG1_RL1/TSGR1_102-e/Docs/R1-2005895.zip R1-2005895 Intel—eV2X-EM.docx [retrieved on Aug. 8, 2020].

(Continued)

*Primary Examiner* — Andre Tacdiran
(74) *Attorney, Agent, or Firm* — LEYDIG, VOIT & MAYER, LTD.

(57) ABSTRACT

A method for factoring in energy intensity regarding the transmission of data as part of a quality-of-service-controlled data connection involving a user equipment and a node of a network. The network includes a core network and an access network including a plurality of base station entities. The user equipment is connected to a base station entity, and the connection includes a data stream. A quality-of-service indication is associated with each data stream. In order to take into account the energy intensity of data (Continued)

transmissions, the method comprises a first step where a quality-of-service indication is associated with the data stream, where the quality-of-service indication comprises an energy intensity-related indication, related to the transmission of the data of the data stream, and a second step where the transmission of the data of the data stream is performed based on the quality-of-service indication, including the energy intensity-related indication.

9 Claims, 1 Drawing Sheet

(56) References Cited

U.S. PATENT DOCUMENTS

| | | | |
|---|---|---|---|
| 10,285,182 B2 | 5/2019 | Koudouridis et al. | |
| 2009/0067328 A1* | 3/2009 | Morris | H04W 72/569 370/230.1 |
| 2011/0319072 A1* | 12/2011 | Ekici | H04W 48/18 455/553.1 |
| 2014/0376400 A1 | 12/2014 | Kanamarlapudi et al. | |
| 2015/0063111 A1* | 3/2015 | Merlin | H04B 7/0452 370/235 |
| 2015/0312383 A1* | 10/2015 | Roeland | H04L 69/18 370/331 |
| 2016/0135144 A1 | 5/2016 | Tsai et al. | |
| 2019/0097936 A1* | 3/2019 | Yang | H04W 12/03 |
| 2019/0288953 A1* | 9/2019 | Yavuz | H04W 28/0205 |
| 2024/0172038 A1* | 5/2024 | Pateromichelakis | H04W 28/0268 |

FOREIGN PATENT DOCUMENTS

| | | | |
|---|---|---|---|
| CN | 106576338 A | | 4/2017 |
| CN | 106793051 A | | 5/2017 |
| CN | 106973413 A | | 7/2017 |
| CN | 108770015 | * | 3/2021 |
| EP | 2768256 A1 | | 8/2014 |
| JP | 2016525300 A | | 8/2016 |
| JP | 2019029926 A | | 2/2019 |
| WO | WO 00/54437 A2 | | 9/2000 |
| WO | WO 2002/003733 A1 | | 1/2022 |

OTHER PUBLICATIONS

Huawei et al: "Controlling ES impact on QoS", 3GPP Draft; R3-132078 ESCOV QOS, 3rd Generation Partnership Project (3GPP), Mobile Competence Centre; Nov. 2013 (Nov. 1, 2013), pp. 1-5, vol. RAN WG3, 650, Route Des Lucioles; F-06921 Sophia-Antipolis Cedex; France, No. San Francisco, USA; XP050755036, Retrieved from the Internet: URL:http://www.3gpp.org/ftp/tsg_ran/WG3_lu/TSGR3_82/Docs/ [retrieved on Nov. 1, 2013].

* cited by examiner

METHOD FOR TAKING INTO ACCOUNT ENERGY INTENSITY REGARDING THE TRANSMISSION OF DATA PACKETS, AS PART OF A QUALITY-OF-SERVICE-CONTROLLED DATA CONNECTION, TOWARDS A USER EQUIPMENT, TELECOMMUNICATIONS NETWORK, USER EQUIPMENT, PROGRAM, AND COMPUTER-READABLE MEDIUM

CROSS REFERENCE TO RELATED APPLICATIONS

This application is a U.S. National Phase application under 35 U.S.C. § 371 of International Application No. PCT/EP2022/061711, filed on May 2, 2022, and claims benefit to European Patent Application No. EP 21172639.3, filed on May 7, 2021. The International Application was published in English on Nov. 10, 2022 as WO 2022/233786 A1 under PCT Article 21(2).

FIELD

The present invention relates inter alia to a method for taking into account energy intensity regarding the transmission of data packets, as part of a quality-of-service-controlled data connection, towards a user equipment.

Additionally, the present invention relates to a telecommunications network for taking into account energy intensity regarding the transmission of data packets as part of a quality-of-service-controlled data connection towards a user equipment.

Furthermore, the present invention relates to a user equipment configured to be used in an inventive telecommunications network.

Furthermore, the present invention relates to a program comprising a computer readable program code, and to a computer-readable medium for using an inventive user equipment or an inventive telecommunications network.

BACKGROUND

The energy consumption in cellular networks, especially in new systems like 5G is comparatively high. Due to the Shannon-Hartley-Theorem, a certain minimum amount of energy per transmitted bit is and will always be necessary for realizing any (reliable) data transmission over a wireless transmission channel. Hence, as part of the global responsibility of companies and industries to meet CO2 reduction targets, a new approach is needed.

SUMMARY

In an embodiment, the present disclosure provides a method for taking into account energy intensity regarding a transmission of data packets, as part of a quality-of-service-controlled data connection, towards a user equipment involving at least one network node of a telecommunications network, the telecommunications network comprising or being assigned to a core network and the telecommunications network comprising or being assigned to an access network comprising a plurality of base station entities, the user equipment being connected to a specific base station entity of the plurality of base station entities, wherein the data connection comprises or transports at least one data stream, wherein a quality-of-service indication information is associated or applied to each data stream of the at least one data stream, wherein, in order to take into account the energy intensity of data transmissions as part of the data connection, the method comprising: in a first step, regarding a specific data stream, a specific quality-of-service indication information is associated or applied to the specific data stream, wherein the quality-of-service indication information comprises an energy intensity-related indication, related to the energy intensity of the transmission of the data packets of the specific data stream, in a second step, subsequent to the first step, the transmission of the data packets of the specific data stream is performed based on the quality-of-service indication information, comprising the energy intensity-related indication.

BRIEF DESCRIPTION OF THE DRAWINGS

Subject matter of the present disclosure will be described in even greater detail below based on the exemplary figures. All features described and/or illustrated herein can be used alone or combined in different combinations. The features of various embodiments will become apparent by reading the following detailed description with reference to the attached drawings, which illustrate the following.

DETAILED DESCRIPTION

Figure 1:
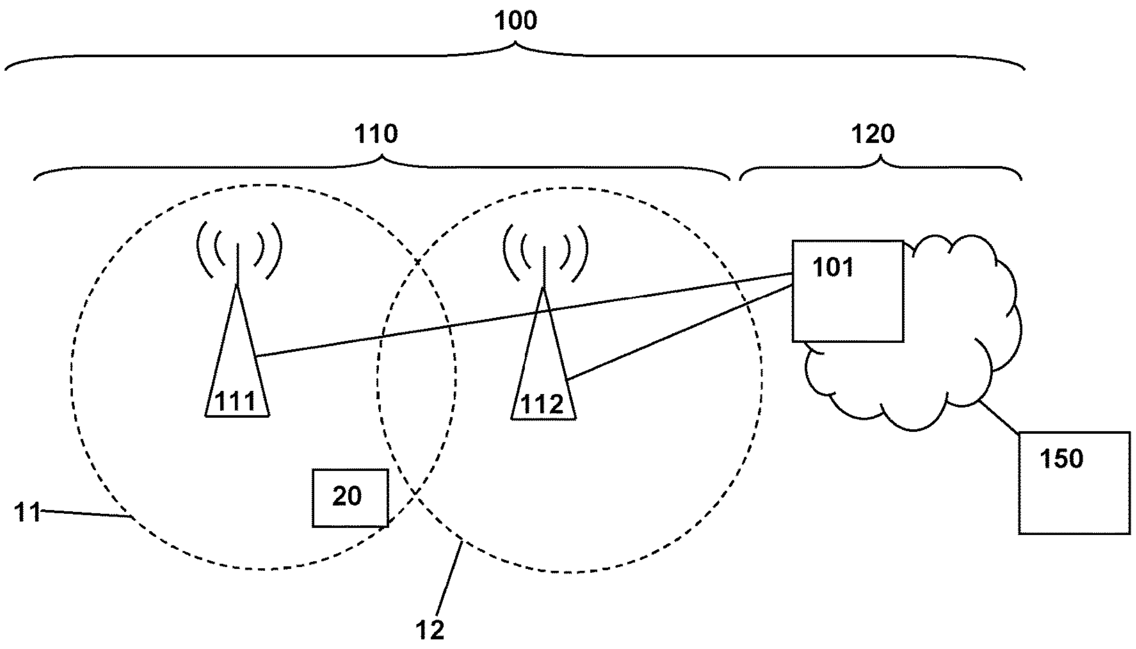
FIG. 1 schematically illustrates a mobile communication network comprising a multitude of radio cells being served by a multitude of base station entities, and a user equipment being served by the mobile communication network.

The present invention provides a method for taking into account energy intensity regarding the transmission of data packets, as part of a quality-of-service-controlled data connection, towards a user equipment on a comparatively fine-granular level, wherein by means of using, by the telecommunications network, an energy intensity-related indication, data transmission from the telecommunications network and the user equipment is able to be realized requiring less amounts of energy, resulting in a reduced overall consumption of energy involved in realizing wireless data transmission.

In an embodiment, the present invention provides a method for taking into account energy intensity regarding the transmission of data packets, as part of a quality-of-service-controlled data connection, towards a user equipment involving at least one network node of a telecommunications network, the telecommunications network comprising or being assigned to a core network and the telecommunications network comprising or being assigned to an access network comprising a plurality of base station entities, the user equipment being connected to a specific base station entity of the plurality of base station entities, wherein the data connection comprises or transports at least one data stream, wherein a quality-of-service indication information is associated or applied to each data stream, wherein, in order to take into account the energy intensity of data transmissions as part of such a data connection, the method comprises the following steps:

in a first step, regarding a specific data stream, a specific quality-of-service indication information is associated or applied to the specific data stream, wherein the quality-of-service indication information comprises an energy intensity-related indication, related to the energy intensity of the transmission of the data packets of the specific data stream, in a second step, subsequent to the first step, the transmission of the data packets of the specific data stream is performed dependent on the quality-of-service indication information, comprising the energy intensity-related indication.

According to the present invention, it is thereby advantageously possible to specifically adjust—with fine granularity and depending on the energy intensity-related indication used by the telecommunications network—the energy consumption or energy intensity of the specifically considered wireless data transmission from the telecommunications network, or the corresponding network node (typically a base station entity) thereof, towards the user equipment while still satisfying the quality-of-service requirements as comprised by the quality-of-service indication information associated or applied to the specific data stream considered.

In modern mobile communication systems, especially cellular communication systems, there are multiple ways to provide for a transmission of data, starting from the usage of very different radio technologies of the different generations of radio access technologies (like GSM/UMTS/LTE/NB-IOT/LTE-M/5G) within public land mobile networks, but also the different variants of WiFi technology, also called wireless local area network, WLAN. This flexibility of having multiple ways or manners (or the plurality of radio access technologies or the plurality of radio signal transmission schemes) to transfer data lead to a choice or a selection of the radio access technology.

In conventionally known telecommunications networks, while the high-level topic of the importance of energy consumption is known as such, the implemented wireless, especially cellular, standards overwhelmingly used today, like LTE or 5G, do not provide a specific solution or implementation that specifically also takes into account—besides other considerations—the amount of energy (or the energy intensity of the considered data transmission) used to transmit a specifically considered amount of data, or a specifically considered connection or data flow on a fine-granular level.

Any data transmission over a wireless channel may require a minimum amount of energy per bit transmitted, this principle having been outlined, already many decades ago, by Claude Shannon and Ralph Hartley in the famous and still valid Shannon-Hartley-Theorem, stating that Eb/N0>ln 2, i.e. the transmission of a certain number of bits may require a minimum amount of energy (Eb), and, in turn, the faster the transmission of data over a non-ideal channel is, the more energy may be required (or the higher the amount of transferred data, the higher the energy consumption).

In conventionally known cellular communication systems, there are multiple ways for the transmission of data, starting from the usage of very different radio technologies (such as, e.g., GSM/UMTS/LTE/NB-IOT/LTE-M/5G, etc.) to the possibility of having very different transmission configurations within a certain radio technology (e.g. different modulation schemes, incl. higher order modulation (512/1024 QAM), redundancy, bandwidth, repetition, latency, bitrate, etc.). This flexibility conventionally allows for the configuration of data transmission with the aim of using optimum channel capacity, while on the other hand the need to minimize the energy may be required for such a transmission is typically not considered, especially not with fine granularity—as, conventionally, the goal always has been to increase the so-called "spectral efficiency" for the best usage of the spectrum. Under this approach, for example, 5G developed massive MIMO antenna concepts, as for example 64T64R, which are great to achieve a high spectrum efficiency in a given bandwidth, but that are, on the other hand, highly energy consuming.

Since quite some time in the development of conventional mobile communication networks (at least since LTE times), the decision, how a packet is treated or routed throughout the network—and especially via the air interface between the access network and the user equipment—is based on a quality-of-service (QOS) concept, defined in terms of QoS parameters which consist of parameters, like max. packet delay budget, packet error rate, packet priority and others [e.g. 3GPP TS 23.501 for 5G]. These parameters are signaled for a given data bearer or IP flow from the CN to the RAN, typically based on subscription or packet/service classification in the CN. The eNB (LTE) or gNB (NR) scheduler receiving packets via such bearer within a PDU session uses these parameters, especially the QCI and locally defined scheduling rules, to treat a packet appropriately based on the configured QCI.

Hence, regarding a specific amount of data, or a specific connection or data flow or stream, there is conventionally no consideration of an energy budget used, or an energy priority, neither on the device (user equipment) side nor on the network side.

According to the present invention, the network side (i.e. the base station entity, or another network node of the access network, or another network node of the telecommunications network) is involved in defining or in determining the energy-intensity to be applied to a specific amount of (downlink) data, or a specific connection or data flow or data stream. Hence, according to the present invention, the energy intensity is taken into consideration (or able to be taken into consideration) regarding the transmission of data packets, as part of a quality-of-service-controlled data connection, towards a user equipment involving at least one network node of a telecommunications network. Typically, the telecommunications network comprises or is assigned to a core network and the telecommunications network comprises or is assigned to an access network comprising a plurality of base station entities, and the user equipment is connected to a specific base station entity of the plurality of base station entities (of the access network). The data connection typically comprises or transports at least one data stream (or data flow), wherein a quality-of-service indication information is associated or applied (by a network node of the telecommunications network, especially of the core network) to each data stream.

In order for the energy intensity of such data transmissions (i.e. data transmissions as part of such a data connections) between the telecommunications network and the user equipment to be taken into consideration (or to be able to be taken into consideration) on a comparatively fine grained level, it is proposed, according to the present invention, that, in a first step, regarding a specific data stream, a specific quality-of-service indication information is associated or applied to the specific data stream, wherein the quality-of-service indication information comprises an energy intensity-related indication, related to the energy intensity of the transmission of the data packets of the specific data stream. In a second step, subsequent to the first step, the transmission of the data packets of the specific data stream is performed dependent on the quality-of-service indication information, comprising the energy intensity-related indication.

Hence, according to the present invention, the energy intensity-related indication (as part of the quality-of-service indication information) is advantageously possible to be used to take the energy intensity of data transmissions as part of data connections (from the telecommunications network towards the user equipment) into consideration on a comparatively fine grained level.

Hence, the present invention proposes to utilize information about an "energy Budget" or an "energy Priority" (as contained in the energy intensity-related indication) for the routing or the transmission of that packets. Thus, the present invention is especially related to the configuration of the quality-of-service-controlled data connection (established to transport data towards the user equipment) and the related signaling (especially between the core network of the telecommunications network and the access network of the telecommunications network by means of the energy intensity-related indication) for especially setting different "energy consumption" and/or "sustainability" profiles.

According to the present invention, it is assumed that the telecommunications network and the user equipment support the selection of a multiplicity of access technologies and/or transmission schemes. Possible access technologies in this sense are technologies using licensed or unlicensed spectrum, using techniques such GPRS/EDGE, UMTS/HSPA, LTE/LTE-A, WIFI etc. with features like higher-order modulation, power control, MIMO, beam forming, carrier aggregation, etc.

According to an embodiment of the present invention, the transmission of downlink data streams—from the access network towards the user equipment—may require the transmission, towards the user equipment, of the respective data packets to be scheduled by a scheduler entity or functionality, especially a scheduler entity or functionality as part of the base station entity connected to the user equipment, wherein the scheduling algorithm uses the energy intensity-related indication of the quality-of-service indication information,

- wherein especially the energy intensity-related indication, as well as an indication related to the available packet delay budget, is used for such scheduling, especially regarding individual data packets of the considered data streams or all data streams of the considered quality-of-service-controlled data connection,
- wherein especially the energy intensity-related indication corresponds to an indication whether to apply, if possible with regard to the available packet delay budget and regarding a considered data stream, a less energy intensive transmission of data packets.

Thereby, it is advantageously possible that the decision or the choice to be made (i.e. which radio access technology and/or which radio signal transmission scheme to be used in a specific situation) is based on whether the priority (as informed by the energy intensity-related indication) is directed to a preference of either a lower (or allowing for a higher) level of energy intensity. Of course, according to variants or embodiments of the present invention, a higher granularity of such a priority is possible, e.g., in the form of having three different levels of energy priority information, such as "low", "middle", "high".

According to a further embodiment of the present invention, the energy intensity-related indication corresponds to at least one out of the following:

- a quality-of-service flow parameter, especially besides other quality-of-service flow parameters like allocation and retention policy, ARP, reflective quality-of-service attribute, RQA,
- an indication, as part of the 5G quality-of-service identifier, 5QI, or as part of the quality-of-service class identifier, QCI, and especially an indication regarding each quality-of-service class or each default priority level within the 5G quality-of-service identifier or within the quality-of-service class identifier, whether to apply, if possible with regard to the available packet delay budget and regarding a considered data stream, a less energy intensive transmission of data packets.

Thereby, it is advantageously possible that the energy intensity-related indication is able to transmitted as part of the (quality-of-service) definition of the quality-of-service-controlled data connection using a multitude of different manners. Hence, the content of the energy intensity-related indication (or the content of a plurality of pieces of energy intensity-related indication) is able to convey a fine-grained indication, e.g., as to which radio access technology and/or which radio signal transmission scheme within a radio access technology shall be used.

Furthermore, according to the present invention, the (quality-of-service-controlled) data connection comprises or is segmented into

- a first connection part between the core network or a network node thereof and the base station entity, and
- a second connection part between the base station entity and the user equipment.

It is thereby advantageously possible to comparatively easily apply the concept of the present invention.

According to still further embodiments of the present invention:

- the data connection corresponds to a protocol data unit session, PDU session, linking the user equipment, the base station entity as a gNodeB entity or functionality, and the user plane function, UPF, as the network node of the core network or

- the data connection corresponds to a packet data network connection, PDN connection, linking the user equipment, the base station entity as an eNodeB entity or functionality, and the serving gateway, SGW, as the network node of the core network.

Thereby, it is advantageously possible according to the present invention to realize the proposed method both in an LTE setup or implementation of the telecommunications network and/or the user equipment, and in a 5G setup or implementation.

According to a further embodiment of the present invention, between the telecommunications network and the user equipment, radio resources of an air interface between the user equipment and the access network are used such that a plurality of radio access technologies and/or a plurality of radio signal transmission schemes are able to be used for transmitting downlink data—from the radio access network towards the user equipment —, the plurality of radio access technologies and/or the plurality of radio signal transmission schemes being associated with or related to a first, lower level of energy intensity or at least a second, higher level of energy intensity,

- wherein especially dependent on the quality-of-service indication information, comprising the energy intensity-related indication,
  - either a radio access technology and/or a radio signal transmission scheme associated with the first level of energy intensity is used in case that the available packet delay budget allows for and the energy intensity-related indication indicates so, or a radio access technology and/or a radio signal transmission scheme associated with the second level of energy intensity is used in case that the available packet delay budget stipulates so or in case the energy intensity-related indication indicates so to fulfill the requirements of the quality-of-service indication information regarding the considered data stream.

It is thereby advantageously possible according to the present invention to be able to adjust the energy consumption or energy intensity of a considered wireless data transmission from the telecommunications network towards the user equipment while still satisfying the quality-of-service requirements, especially with comparatively fine granularity and depending on the energy intensity-related indication used by the telecommunications network.

According to another embodiment of the present invention, the energy intensity-related indication refers to the energy intensity of data transmissions between the telecommunications network and the user equipment in terms of one or a plurality of the following measures of energy intensity:

the energy used per data volume transmitted, such as a value of Joules required per Mbyte transmitted, the energy used per bandwidth used, such as a value of Joules required per bandwidth, especially in Mbit per seconds, applied, the energy used per latency realized, such as a value of Joules required per archiving a latency expressed in milliseconds, wherein especially a first energy intensity-related indication refers to a first of such measures of energy intensity and a second energy intensity-related indication refers to a second of such measures of energy intensity, wherein at least one of the at least one energy intensity-related indication refers to or indicates one of at least three defined different levels of energy intensity, especially of at least four different levels of energy intensity.

Thereby, it is advantageously possible according to the present invention that the energy intensity-related indication refers to different measures or to a multitude of measures and/or that the energy intensity-related indication indicates more than only two different values (such as "high(er)" or "low(er)").

The present invention also relates to a telecommunications network for taking into account energy intensity regarding the transmission of data packets as part of a quality-of-service-controlled data connection towards a user equipment involving at least one network node of the telecommunications network, the telecommunications network comprising or being assigned to a core network and the telecommunications network comprising or being assigned to an access network comprising a plurality of base station entities, the user equipment being connected to a specific base station entity of the plurality of base station entities, wherein the data connection comprises or transports at least one data stream, wherein a quality-of-service indication information is associated or applied to each data stream, wherein, in order to take into account the energy intensity of data transmissions as part of such a data connection, the telecommunications network is configured such that:

a specific quality-of-service indication information is associated or applied to the specific data stream, wherein the quality-of-service indication information comprises an energy intensity-related indication, related to the energy intensity of the transmission of the data packets of the specific data stream, the transmission of the data packets of the specific data stream is performed dependent on the quality-of-service indication information, comprising the energy intensity-related indication.

Thereby it is advantageously possible, that—also with respect to the telecommunications network—the energy intensity is able to be modulated or modified, especially based on a decision or preference of the user equipment's user, for a specific user equipment.

The present invention also relates to a user equipment configured to be used in a telecommunications network according to the present invention.

Thereby it is advantageously possible, that—also with respect to the user equipment—the energy intensity is able to be modulated or modified, especially based on a decision or preference of the user equipment's user, for a specific user equipment.

Furthermore, the present invention relates to a program comprising a computer readable program code which, when executed on a computer or on a network node of a telecommunications network or on a base station entity, or in part on the network node of the telecommunications network and/or in part on the base station entity, causes the computer or the network node of the telecommunications network or the base station entity to perform the inventive method.

The present invention also relates to a computer-readable medium comprising instructions which when executed on a computer or on a network node of a telecommunications network or on a base station entity, or in part on the network node of the telecommunications network and/or in part on the base station entity, causes the computer or the network node of the telecommunications network or the base station entity to perform the inventive method.

These and other characteristics and features and advantage of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100 is schematically shown. In the example, the mobile communication network 100 comprises an access network 110 and a core network 120. The mobile communication network 100 is a cellular telecommunications network comprising typically a plurality of network cells (or radio cells), wherein two radio cells are represented in FIG. 1 by means of reference signs 11 and 12: a first radio cell 11, and a second radio cell 12. The access network 110 comprises at least a first base station entity 111 serving the first radio cell 11, and a second base station entity 112, serving the second radio cell 12. A user equipment 20 is schematically depicted in FIG. 1 as an example of a user equipment in contact to the telecommunications network 100. The user equipment 20 is connected to one of the base station entities 111, 112, in the example shown to the first base station entity 111. The mobile communication network 100 comprises a network node 101 of especially the core network 120, wherein the network node 101 is involved in establishing a quality-of-service-controlled data connection 200 (shown in FIG. 2) between the telecommunications network 100 and the user equipment 20. Especially, the quality-of-service-controlled data connection 200 is a downstream (or downlink) data connection for transmitting data packets in downlink direction, i.e. from the telecommunications network 100 towards the user equipment 20.

Regarding such data transmissions between the telecommunications network 100 and the user equipment 20, the present invention provides a method (as well as a corresponding telecommunications network 100 and a corresponding user equipment 20) for taking into account energy intensity regarding the transmission of data packets, as part of the quality-of-service-controlled data connection 200, towards a user equipment 20 (i.e. in downlink direction) involving the at least one network node 101 of the telecommunications network 100. The user equipment 20 is typically, at least temporarily, in communication exchange with the telecommunications network 100 using radio resources of an air interface between the user equipment 20 and the access network 110 (i.e. the respective base station entities 111, 112). Regarding this communication exchange or in order to realize this data transmission or transmissions, typically a plurality of radio access technologies and/or a plurality of radio signal transmission schemes (or also a plurality of radio signal transmission schemes as part of one (or each) radio access technology) are available or are able to be used for transmitting such downlink data, i.e. from the telecommunications network 100 towards the user equipment 20.

It is known that such a plurality of radio access technologies and/or radio signal transmission schemes (or combinations thereof) either involve a comparatively low or lower energy intensity (according to different measures to be discussed in greater detail), or otherwise involve a comparatively high or higher energy intensity—or, of course, are able to be ranked for their energy intensity. Typically, radio access technologies and/or radio signal transmission schemes (or combinations thereof) involving a lower energy intensity are less performant regarding usual quality-of-service criteria such as bandwidth, latency, error rate and the like, and vice versa, i.e. radio access technologies and/or radio signal transmission schemes (or combinations thereof) involving a higher energy intensity are more performant regarding such usual quality-of-service criteria. By means of selecting or adapting the radio access technologies and/or radio signal transmission schemes (or combinations thereof) used (for the downlink data stream towards the user equipment 20), it is advantageously possible, according to the present invention, that especially a corresponding scheduling functionality (or component or entity) within or as part or associated to the base station entity 111 (corresponding to (or serving) the user equipment 20) is able to modify the energy intensity on a comparatively fine-grained level.

Figure 2:
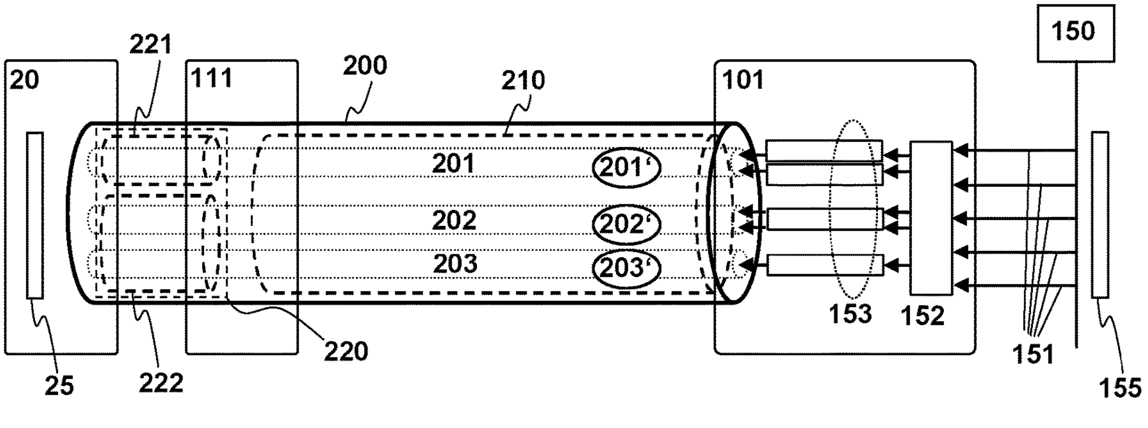
FIG. 2 schematically illustrates an exemplary representation of the transmission of data packets, as part of a quality-of-service-controlled data connection, towards a user equipment involving at least one network node of the telecommunications network.

According to the present invention, the data connection 200 comprises or transports at least one data stream, wherein a quality-of-service indication information is associated or applied to each data stream, and wherein the quality-of-service indication information (being specific for (or associated or applied to) each data connection or data stream) comprises the energy intensity-related indication. This is schematically shown in FIG. 2 which shows an exemplary representation of the transmission of data packets, as part of a quality-of-service-controlled data connection 200, towards the user equipment 20 involving at least one network node 101 of the telecommunications network 100. The network node 101 is typically part of the core network 110 of the telecommunications network 100. The quality-of-service-controlled data connection 200 is established between this network node 101 and the user equipment 20 (to which communication data has to be transmitted, typically in the form of data packets as one data stream or data flow or as a plurality of data streams or data flows), typically via a corresponding base station entity of the radio access network 120 (i.e. in case of user equipment 20, the corresponding specific base station entity 111, depicted in FIG. 1, in whose radio coverage area (or radio cell 11) the user equipment 20 is located).

The data to be transmitted (in downlink direction) to the user equipment 20 are typically provided, to the network node 101 (and, eventually, to the user equipment 20), by a data network 150 (or application server) which, however, is only schematically shown in FIG. 2. One or a plurality of applications within or as part of (or provided by) the data network or application server 150 is or are schematically indicated, in FIG. 2, by means of reference sign 155. In the example shown in FIG. 2, a plurality of internet protocol flows (IP flows), collectively indicated by means of reference sign 151, are provided or transmitted, by the data network 150, to the network node 101, especially to a filtering stage 152 thereof, providing traffic flow template, TFT, filtering, typically used to guide different packet flows (of data packet streams) belonging to a particular service, service data flows, SDF, of or related to one of the applications 155. After the filtering stage 152, service data flows, collectively indicated by means of reference sign 153 (and corresponding to the internet protocol flows 151), are provided or transmitted, by or within the network node 101 to the quality-of-service-controlled data connection 200; this is also referred to as quality-of-service flow identifier insertion, QFI insertion.

Typically, as part of the quality-of-service-controlled data connection 200, one or a plurality of quality-of-service flows, or data streams, are established or realized between the network node 101 and the user equipment 20, in order to provide the information content of the respective data streams or quality-of-service flows to applications 25 of or within the user equipment 20, via the base station entity 111. In FIG. 2, the exemplarily represented data connection 200 comprises three quality-of-service flows or data streams, a first data stream 201, a second data stream 202, and a third data stream 203. Each such data stream 201, 202, 203 comprises (or is associated or applied to) a quality-of-service indication information, i.e. the first data stream 201 a first quality-of-service indication information 201', the second data stream 202 a second quality-of-service indication information 202', and the third data stream 203 a third quality-of-service indication information 203'; or vice versa, i.e. the corresponding quality-of-service indication information 201', 202', 203' is associated or applied to the corresponding data stream 201, 202, 203, respectively. Typically, the quality-of-service-controlled data connection 200 comprises or is segmented into a first connection part 210 (e.g. an N3 tunnel) between the core network 120 or the network node 101 thereof and the base station entity 111, and a second connection part 220 between the base station entity 111 and the user equipment 20, the second connection part 220 of the data connection 200 especially comprising or corresponding to one or a plurality of radio data bearer(s), wherein in FIG. 2, a first radio radio data bearer 221, and a second radio data bearer 222 are exemplarily shown.

According to the present invention, the data connection 200 comprises or transports at least one data stream 201, 202, 203, wherein the quality-of-service indication information 201', 202', 203' is associated or applied to each data stream 201, 202, 203, respectively, and wherein the quality-of-service indication information 201', 202', 203' (being specific for (or associated or applied to) each data connection or data stream) comprises the respective energy intensity-related indication. Especially according to the present invention, each one of the data streams 201, 202, 203 (and, hence, each one of the quality-of-service indication information 201', 202', 203') comprises its own (or associated or assigned) energy intensity-related indication, or alternatively, there is one energy intensity-related indication for each data connection 200 (i.e. as part of the same data connection 200, each data stream 201, 202, 203 (and, hence, each one of the quality-of-service indication information 201', 202', 203') comprises the identical energy intensity-related indication. In the context of the present invention and in the following, the first data stream 201 is taken as an example, and is also called the specific data stream 201. The respective (specific) quality-of-service indication information 201' comprises the energy intensity-related indication, which is related to the energy intensity, to be applied (or used), regarding the transmission of the data packets of the specific data stream 201. Hence, the transmission of the data packets of the specific data stream 201 is able to be performed dependent (also, i.e. besides other quality-of-service parameters of the quality-of-service indication information 201') on the energy intensity-related indication of the quality-of-service indication information 201'.

According to the present invention, the transmission of downlink data streams—from the access network 110 towards the user equipment 20—may require the transmission, towards the user equipment 20, of the respective data packets to be scheduled by a scheduler entity or functionality, especially a scheduler entity or functionality as part of the base station entity 111 connected to the user equipment 20. According to an embodiment of the present invention, the involved scheduling algorithm uses or is able to use the energy intensity-related indication of the quality-of-service indication information 201', especially in such a manner that the energy intensity-related indication, as well as an indication related to the available packet delay budget, is used for such scheduling, especially regarding individual data packets of the considered data stream 201 or all data streams 201, 202, 203 of the considered quality-of-service-controlled data connection 200. Especially, the energy intensity-related indication corresponds to an indication whether (or not) to apply, if possible with regard to the available packet delay budget and regarding the considered data stream 201, a less energy intensive transmission of data packets.

The quality-of-service indication information 201' (and, of course, also the other pieces of quality-of-service indication information 202', 203') typically comprise a certain number of quality-of-service flow parameters, such as, e.g., at least a plurality out of the following: a 5QI information (5G quality-of-service identifier information), an ARP information (allocation and retention priority information), a GFBR information (guaranteed flow bit rate information), a MFBR information (maximum flow bit rate information), a PDB information (packet delay budget information), a PER information (packet error rate information), a QFI information (quality-of-service flow identifier information), and a RQA information (reflective quality-of-service attribute information). According to the present invention, the energy intensity-related indication is able to be 'integrated' (or be part of the (specific) quality-of-service indication information 201') in different possible manners: Especially, the energy intensity-related indication is able to be part of the quality-of-service indication information 201' such that it corresponds to a quality-of-service flow parameter, especially an additional quality-of-service flow parameter, i.e. besides other quality-of-service flow parameters like the allocation and retention policy, ARP, information, or the reflective quality-of-service attribute, RQA, information. Alternatively or cumulatively, the energy intensity-related indication is able to be part of the quality-of-service indication information 201' such that it corresponds to an indication, as part of the 5G quality-of-service identifier, 5QI, information, or as part of the quality-of-service class identifier, QCI, information. Especially in the latter case, the energy intensity-related indication corresponds to an indication regarding each quality-of-service class or each default priority level within the 5G quality-of-service identifier or within the quality-of-service class identifier, whether to apply, if possible with regard to the available packet delay budget and regarding a considered data stream, a less energy intensive transmission of data packets.

Especially according to the present invention, the data connection 200 is a 5G data connection, and, thus, corresponds to a protocol data unit session, PDU session, linking the user equipment 20, the base station entity 111 as a gNodeB entity or functionality, and the user plane function, UPF, as the network node 101 of the core network 120. Alternatively, the data connection 200 is an LTE data connection, and, thus, corresponds to a packet data network connection, PDN connection, linking the user equipment 20, the base station entity 111 as an eNodeB entity or functionality, and the serving gateway, SGW, as the network node 101 of the core network 120.

The energy intensity-related indication especially refers to the energy intensity of data transmissions between the telecommunications network 100 and the user equipment 20 in terms of one or a plurality of the following measures of energy intensity:

the energy used per data volume transmitted, such as a value of Joules required per Mbyte transmitted, the energy used per bandwidth used, such as a value of Joules required per bandwidth, especially in Mbit per seconds, applied, the energy used per latency realized, such as a value of Joules required per archiving a latency expressed in milliseconds.

According to the present invention, the information regarding the energy intensity-related indication needs to be transmitted to the base station entity 111, hence, eNB/gNB (base station entity) needs to know this information in order to utilize it in the scheduling decision (i.e. whether a (data) packet should be sent fast using a comparatively high energy consumption (because the delay budget is already taken to x %), or whether there is still room for a slower but more energy-friendly data transmission configuration). By applying such a scheduling decision, the energy consumption for the transmission of each individual (data) packet can be optimized and thus the overall energy consumption, minimized for the cellular system.

According to a first alternative embodiment, it is proposed to apply or to define (as the energy intensity-related indication) an additional parameter to the QoS Flow table (i.e. a quality-of-service flow parameter) as a dedicated parameter; the parameter could, e.g., be a multilevel energy priority (e.g. four levels, but not limited to four, like "1. Minimize Energy Consumption as much as possible"; "2. Minimize Energy consumption"; "3. default"; "4. Energy consumption irrelevant"). According to a second alternative embodiment, it is proposed to apply or to define (as the energy intensity-related indication) an additional parameter to the 5QI label in 5G or the QCI label in LTE with a dedicated parameter, related to the energy intensity. The meaning of such an additional parameter is similar, i.e. the parameter could, e.g., be a multilevel energy priority (e.g. four levels, but not limited to four, like "1. Minimize Energy Consumption as much as possible"; "2. Minimize Energy consumption"; "3. default"; "4. Energy consumption irrelevant").

A specific focus according to the present invention is to implement the inventive procedures and methods by means of protocol extension for 4G/5G/6G cellular systems being defined by 3GPP; however, this does not exclude to apply the same or corresponding principles and related signaling also for non-3GPP accesses, such as, e.g., WiFi being defined by IEEE 802.11.

In the future, the focus might shift from ultra-high data rates with extremely low latencies to a more (environmentally) sustainable wireless communication, taking also into account the energy intensity of the different radio access technologies and/or radio schemes involved or (predominantly) used.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing a quality-of-service-controlled data connection to a user equipment involving a network node of a telecommunications network, the method comprising:

associating quality-of-service indication information to a specific data stream out of a plurality of data streams of the data connection, wherein the quality-of-service indication information comprises an energy intensity-related indication related to an energy intensity of transmission of data packets of the specific data stream; and performing the transmission of the data packets of the specific data stream based on the associated quality-of-service indication information comprising the energy intensity-related indication;

wherein the method further comprises: scheduling, by a scheduler of a base station connected to the user equipment, data packets for downlink transmission towards the user equipment, wherein the scheduling takes into account the energy intensity-related indication of the quality-of-service indication information and an available packet delay budget.

2. The method according to claim 1, wherein the energy intensity-related indication corresponds to at least one of the following:

a quality-of-service flow parameter; or an indication of whether to apply a less energy intensive transmission of data packets.

3. The method according to claim 1, wherein the data connection comprises:

a first connection part between a core network and the base station; and a second connection part between the base station and the user equipment.

4. The method according to claim 1, wherein the data connection corresponds to a protocol data unit (PDU) session linking the user equipment, the base station, and a user plane function (UPF).

5. The method according to claim 1, wherein the data connection corresponds to a packet data network (PDN) connection linking the user equipment, the base station, and a serving gateway (SGW).

6. The method according to claim 1, further comprising:

selecting between (1) a first radio access technology and/or radio signal transmission scheme and (2) a second radio access technology and/or radio signal transmission scheme based on the quality-of-service indication information regarding the specific data stream, wherein the first radio access technology and/or radio signal transmission scheme corresponds to a lower level of energy intensity than the second radio access technology and/or radio signal transmission scheme.

7. The method according to claim 1, wherein the energy intensity-related indication refers to energy intensity of data transmissions between the telecommunications network and the user equipment in terms of:

energy used per data volume transmitted;

energy used per bandwidth used; and/or energy used per latency realized.

8. A system for providing a quality-of-service-controlled data connection to a user equipment involving a network node of a telecommunications network, comprising:

the user equipment;

the network node; and a base station connected to the user equipment;

wherein the user equipment, the network node, and/or the base station is configured to:

associate quality-of-service indication information to a specific data stream out of a plurality of data streams of the data connection, wherein the quality-of-service indication information comprises an energy intensity-related indication related to energy intensity of transmission of data packets of the specific data stream; and perform the transmission of the data packets of the specific data stream based on the quality-of-service indication information comprising the energy intensity-related indication;

wherein a scheduler of the base station is configured to schedule data packets for downlink transmission towards the user equipment, wherein the scheduling takes into account the energy intensity-related indication of the quality-of-service indication information and an available packet delay budget.

9. One or more non-transitory computer-readable mediums having instructions stored for providing a quality-of-service-controlled data connection to a user equipment involving a network node of a telecommunications network, wherein the instructions, when executed, facilitate performance of the following:

associating quality-of-service indication information to a specific data stream out of a plurality of data streams of the data connection, wherein the quality-of-service indication information comprises an energy intensity-related indication related to an energy intensity of transmission of data packets of the specific data stream; and performing the transmission of the data packets of the specific data stream based on the associated quality-of-service indication information comprising the energy intensity-related indication;

wherein the instructions, when executed, further facilitate performance of the following: scheduling, by a scheduler of a base station connected to the user equipment, data packets for downlink transmission towards the user equipment, wherein the scheduling takes into account the energy intensity-related indication of the quality-of-service indication information and an available packet delay budget.

* * * * *